United States Patent
Andersson et al.

(10) Patent No.: US 12,290,863 B2
(45) Date of Patent: May 6, 2025

(54) COUPLING ARRANGEMENT FOR TOOL, AND TOOL COMPRISING COUPLING ARRANGEMENT

(71) Applicant: ATLAS COPCO INDUSTRIAL TECHNIQUE AB, Stockholm (SE)

(72) Inventors: Patrik Andersson, Skogås (SE); Daniel Hallberg, Sundbyberg (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/567,079

(22) PCT Filed: May 25, 2022

(86) PCT No.: PCT/EP2022/064166
§ 371 (c)(1),
(2) Date: Dec. 5, 2023

(87) PCT Pub. No.: WO2023/280461
PCT Pub. Date: Jan. 12, 2023

(65) Prior Publication Data
US 2024/0261872 A1 Aug. 8, 2024

(30) Foreign Application Priority Data
Jul. 7, 2021 (SE) .................................... 2130190-8

(51) Int. Cl.
*B23B 31/00* (2006.01)
*B23B 31/22* (2006.01)

(52) U.S. Cl.
CPC ............ *B23B 31/008* (2013.01); *B23B 31/22* (2013.01); *B23B 2231/58* (2021.01); *B23B 2265/32* (2013.01)

(58) Field of Classification Search
CPC . B23B 31/08; B23B 31/22; B23B 2231/0232; B23B 2231/58;
(Continued)

(56) References Cited

U.S. PATENT DOCUMENTS 1,340,845 A * 5/1920 Strong .............. B23B 31/10741
403/361
3,767,218 A 10/1973 Bronne et al.
(Continued)

FOREIGN PATENT DOCUMENTS

DE 2621898 A1 * 12/1977
DE 102014108846 A1 12/2015
(Continued)

OTHER PUBLICATIONS

Atlas Copco Industrial Technique AB, International Patent Application No. PCT/EP2022/064166, International Search Report, Aug. 18, 2022.
(Continued)

*Primary Examiner* — Eric A. Gates
(74) *Attorney, Agent, or Firm* — Moore & Van Allen PLLC; W. Kevin Ransom

(57) ABSTRACT

A coupling arrangement for a tool, the coupling arrangement comprising a drive part rotatable about a rotation axis, the drive part comprising a drive profile; a driven part rotatable about the rotation axis, the driven part comprising a driven profile complementary to the drive profile, the driven profile being arranged to mate with the drive profile in a coupled position for torque transfer between the drive part and the driven part; and an aligning arrangement arranged to force a relative rotation between the drive part and the driven part about the rotation axis from a nonaligned state of the coupling arrangement, where the drive profile is not rotationally aligned with the driven profile, towards an aligned
(Continued)

state of the coupling arrangement, where the drive profile is rotationally aligned with the driven profile.

17 Claims, 14 Drawing Sheets

(58) Field of Classification Search
CPC .......... B23B 2265/32; B23B 2265/326; B25B 23/0035; Y10T 279/17145
See application file for complete search history.

(56) References Cited

U.S. PATENT DOCUMENTS

| | | | |
|---|---|---|---|
| 4,174,113 A | 11/1979 | Eckman | |
| 5,417,527 A | 5/1995 | Wienhold | |
| 5,678,961 A | 10/1997 | Fleege et al. | |
| 5,695,305 A | 12/1997 | Heym | |
| 6,079,716 A * | 6/2000 | Harman, Jr. | B25B 21/007 408/239 R |
| 7,669,860 B2 * | 3/2010 | Chiang | B25B 15/001 279/143 |
| 8,366,122 B2 * | 2/2013 | Lee | B23B 31/107 279/74 |
| 8,776,644 B2 * | 7/2014 | Harper | B25B 23/0035 81/180.1 |
| 2011/0024998 A1 | 2/2011 | Nieh | |
| 2014/0070498 A1 | 3/2014 | Ivinson et al. | |
| 2019/0084134 A1 | 3/2019 | Abbott | |
| 2021/0229248 A1 | 7/2021 | Nakamura | |

FOREIGN PATENT DOCUMENTS

| | | | | |
|---|---|---|---|---|
| DE | 102014109229 A1 | | 1/2016 | |
| DE | 102014112288 A1 | | 3/2016 | |
| DE | 202016104002 U1 | | 9/2016 | |
| EP | 1598133 A1 | * | 11/2005 | ........... B23B 31/001 |
| EP | 1878524 A2 | | 1/2008 | |
| JP | 08506770 A | | 7/1996 | |
| WO | 2020075752 A1 | | 4/2020 | |

OTHER PUBLICATIONS

Atlas Copco Industrial Technique AB, International Patent Application No. PCT/EP2022/064166, Written Opinion, Aug. 18, 2022.
Atlas Copco Industrial Technique AB, International Patent Application No. PCT/EP2022/064166, International Preliminary Report on Patentability, Oct. 5, 2023.
Atlas Copco Industrial Technique AB, Swedish Patent Application No. 2130190-8, Swedish Search Report, Jan. 26, 2022.
Atlas Copco Industrial Technique AB, Japanese Patent Application No. 2024-500217, Office Action, Jul. 31, 2024.

* cited by examiner

COUPLING ARRANGEMENT FOR TOOL, AND TOOL COMPRISING COUPLING ARRANGEMENT

CROSS-REFERENCE TO RELATED APPLICATIONS

This application is a National Stage Patent Application (filed under 35 § U.S.C. 371) of PCT/EP2022/064166, filed May 25, 2022 of the same title, which, in turn claims priority to Swedish Patent Application No. 2130190-8 filed Jul. 7, 2021 of the same title; the contents of each of which are hereby incorporated by reference.

TECHNICAL FIELD

The present disclosure generally relates to a coupling arrangement. In particular, a coupling arrangement for a tool, and a tool comprising such coupling arrangement, are provided.

BACKGROUND

Industrial power tools, such as nutrunners, are widely used in the manufacturing industry, e.g. in vehicle manufacturing and in the aerospace industry. Power tools of this type typically have a tool head which interacts with a workpiece and a main body which is held by the user when operating the power tool. The main body may alternatively form part of a robot.

In some applications, it is desirable to have interchangeable tool heads, which may be used for different applications in a manufacturing process. The tool head, such as an angle head, may therefore be removably connected to the main body.

SUMMARY

In order to attach a tool head to a main body of a power tool, a hexagonal driven part in the tool head may have to be rotationally aligned with a correspondingly shaped hexagonal drive part in the tool body before the hexagonal surfaces can mate. This may be difficult for the user and the user may not always have an unobstructed sight of the mating surfaces. There is also a risk that the surfaces do not mate properly.

One object of the present disclosure is to provide a coupling arrangement for a tool, which coupling arrangement enables easy mating of a drive profile with a driven profile.

A further object of the present disclosure is to provide a coupling arrangement for a tool, which coupling arrangement enables a seamless mating of a drive profile with a driven profile.

A still further object of the present disclosure is to provide a coupling arrangement for a tool, which coupling arrangement has a less complicated design.

A still further object of the present disclosure is to provide a coupling arrangement for a tool, which coupling arrangement has a cost-efficient design.

A still further object of the present disclosure is to provide a coupling arrangement for a tool, which coupling arrangement has a reliable operation.

A still further object of the present disclosure is to provide a coupling arrangement for a tool, which coupling arrangement solves several or all of the foregoing objects in combination.

A still further object of the present disclosure is to provide a tool comprising a coupling arrangement, which tool solves one, several or all of the foregoing objects. According to a first aspect, there is provided a coupling arrangement for a tool, the coupling arrangement comprising a drive part rotatable about a rotation axis, the drive part comprising a drive profile; a driven part rotatable about the rotation axis, the driven part comprising a driven profile complementary to the drive profile, the driven profile being arranged to mate with the drive profile in a coupled position for torque transfer between the drive part and the driven part; and an aligning arrangement arranged to force a relative rotation between the drive part and the driven part about the rotation axis from a nonaligned state of the coupling arrangement, where the drive profile is not rotationally aligned with the driven profile, towards an aligned state of the coupling arrangement, where the drive profile is rotationally aligned with the driven profile.

Since the aligning arrangement forces the drive part and the driven part towards the aligned state, the drive profile and the driven profile become aligned during relative movement of the drive part and the driven part along the rotation axis. In this way, the drive profile and the driven profile will be aligned when they meet. The coupling arrangement thereby enables a seamless mating of the drive profile and the driven profile. Consequently, the coupling arrangement greatly facilitates attachment of the driven part to the drive part. The coupling arrangement thereby facilitates replacement of tool heads for power tools.

One of the drive part and the driven part may be male, such as a shaft, and the other of the drive part and the driven part may be female, such as a socket. The drive part may be an input part and the driven part may be an output part, or vice versa.

The aligning arrangement may be provided on the drive part or on the driven part. The aligning arrangement may be configured to exert a torque on the drive part and/or on the driven part about the rotation axis from the nonaligned state towards the aligned state.

The driven part may be movable relative to the drive part along the rotation axis from a decoupled position where the driven part is separated from the drive part, to an intermediate aligning position where the drive profile or the driven profile is aligned with the aligning arrangement along the rotation axis, and to the coupled position where driven profile mates with the drive profile.

The aligning arrangement may be arranged to force the relative rotation between the drive part and the driven part in the aligning position. In order to attach the driven part to the drive part, the driven part can thus be moved in a single continuous axial movement from the decoupled position, to the aligning position where the drive part and the driven part are forced into the aligned state by the aligning arrangement, and to the coupled position. When the drive part and the driven part are moved towards each other through the aligning position along the rotation axis, the aligning arrangement will exert an aligning torque along an aligning distance along the rotation axis. The aligning distance may for example be at least 30% of a length of the shortest of a length of the drive profile along the rotation axis and a length of the driven profile along the rotation axis. Due to the aligning distance, the user can continuously move the drive part and the driven part towards each other and does not necessarily have to wait for the aligning arrangement to bring the drive part and the driven part into the aligned state.

The aligning arrangement may comprise a spring. The spring may for example be a leaf spring or a coil spring, such as a compression coil spring.

The aligning arrangement may comprise one or more protruding elements, each arranged to exert a torque on the drive profile or on the driven profile in the nonaligned state. The torque may be relatively large for relatively large rotational displacements between the drive part and the driven part about the rotation axis, and relatively small for relatively small rotational displacements between the drive part and the driven part about the rotation axis.

The spring may be arranged to force the one or more protruding elements in a radial direction with respect to the rotation axis. Thus, the protruding elements may be arranged to be moved against the deformation of the spring. Alternatively, the protruding elements may be resilient.

The coupling arrangement may further comprise a chamfered edge arranged to force the one or more protruding elements against deformation of the spring by relative movement between the drive part and the driven part along the rotation axis, e.g. from the decoupled position to the aligning position. In case the aligning arrangement is provided on the drive part and the drive part is female, the driven part may comprise a chamfered edge arranged to push the one or more protruding elements radially outwards during relative movement between the drive part and the driven part along the rotation axis, at least when the drive part and the driven part are not rotationally aligned. Conversely, in case the aligning arrangement is provided on the driven part and the drive part is female, the drive part may comprise a chamfered edge arranged to push the one or more protruding elements radially inwards during relative movement between the drive part and the driven part along the rotation axis at least when the drive part and the driven part are not rotationally aligned.

Each protruding element may comprise a round shape for contacting the drive profile or the driven profile. The one or more protruding elements may for example be balls or cylinders.

The coupling arrangement may comprise a plurality of protruding elements, such as two, four or six protruding elements. In this case, the protruding elements may lie in a common plane transverse to the rotation axis. Alternatively, or in addition, the protruding elements may be substantially evenly distributed around the rotation axis. The coupling arrangement may comprise at least one pair of oppositely arranged protruding elements (with respect to the rotation axis).

The drive profile and the driven profile may each have a polygonal shape. The polygonal shape may for example be triangular, square, pentagonal or hexagonal.

An angular distance with respect to the rotation axis between two adjacent protruding elements may correspond to an angular distance with respect to the rotation axis between two edges of the polygonal shapes.

The aligning arrangement may be provided on the drive part. In this case, each protruding element may be rotationally aligned, with respect to the rotation axis, with a unique drive side of the polygonal shape of the drive profile.

Alternatively, the aligning arrangement may be provided on the driven part. In this case, each protruding element may be rotationally aligned, with respect to the rotation axis, with a unique driven edge of the polygonal shape of the driven profile.

According to a second aspect, there is provided a tool comprising a coupling arrangement according to the present disclosure. The tool may be a power tool, such as an electric, pneumatic or hydraulic power tool. The power tool may for example be a tightening tool.

The tool may comprise a main body and an end effector detachably attachable to the main body. The end effector may for example be a tool head or a gear attachment. The drive part may be provided in the main body and the driven part may be provided in the end effector.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
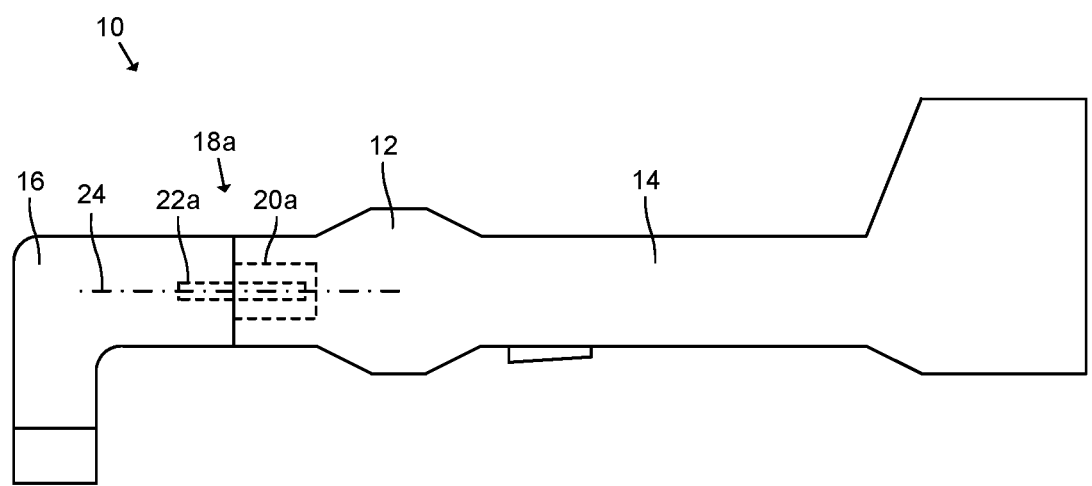
FIG. 1: schematically represents a side view of a tool comprising a coupling arrangement.

In the following, a coupling arrangement for a tool, and a tool comprising such coupling arrangement, will be described. The same or similar reference numerals will be used to denote the same or similar structural features.

FIG. 1 schematically represents a side view of a power tool 10. The power tool 10 may for example be a nutrunner. The power tool 10 comprises a main body 12 having a handle 14. The power tool 10 further comprises a tool head 16 detachably connected to the main body 12. The tool head 16 of this example is an angle head. The tool head 16 may alternatively be a straight head.

The power tool 10 further comprises a coupling arrangement 18a. The coupling arrangement 18a comprises a drive part 20a and a driven part 22a. In this example, the drive part 20a is provided in the main body 12 and the driven part 22a is provided in the tool head 16. In FIG. 1, the drive part 20a is connected to the driven part 22a for common rotation about a rotation axis 24. The drive part 20a can be driven to rotate by a power source, either internal or external of the main body 12. The power source may be electric, pneumatic or hydraulic.

Figure 2A:
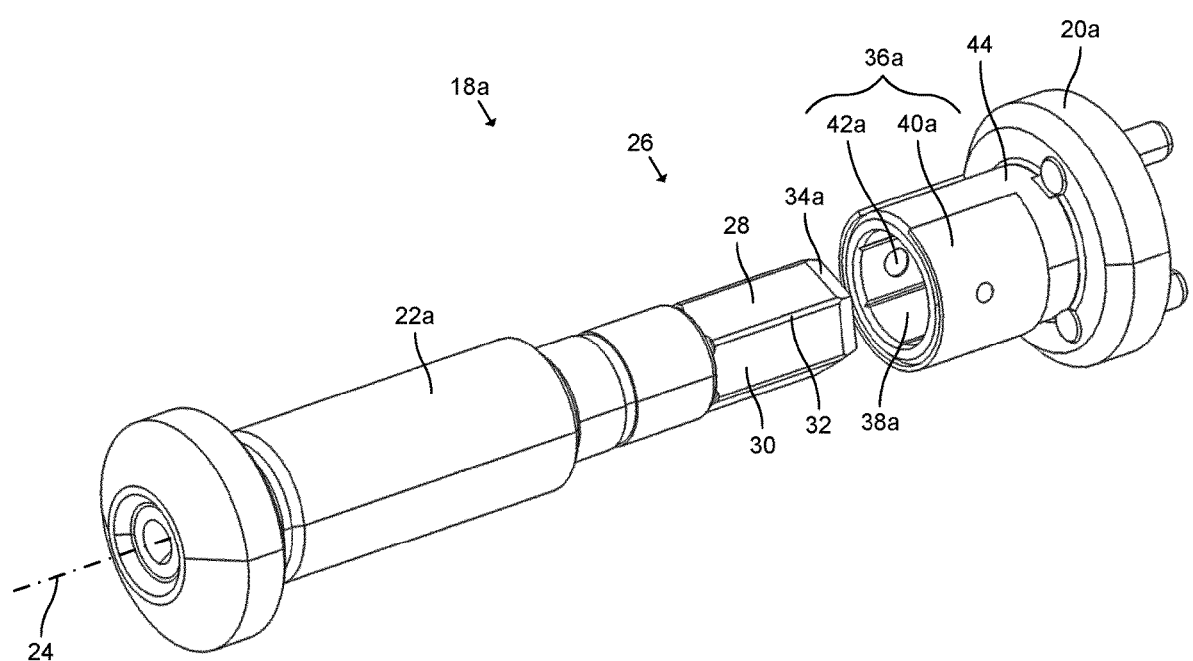
FIG. 2a: schematically represents a first perspective side view of the coupling arrangement in a decoupled position.
Figure 2B:
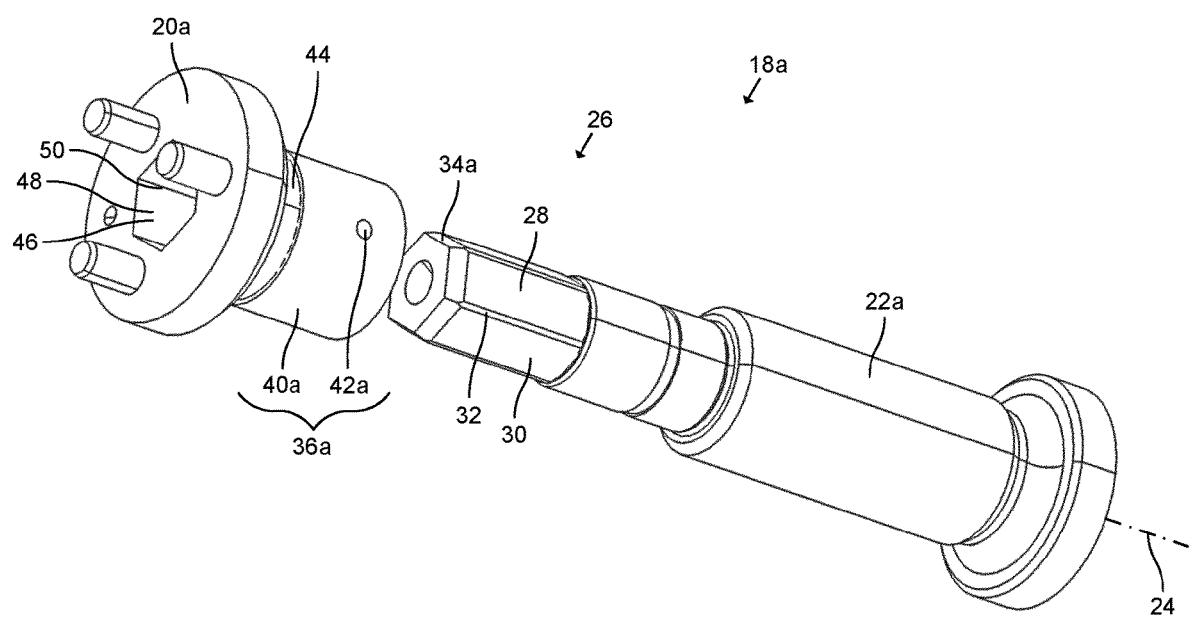
FIG. 2b: schematically represents a second perspective side view of the coupling arrangement in the decoupled position.

FIG. 2a schematically represents a first perspective side view of the coupling arrangement 18a, and FIG. 2b schematically represents a second perspective side view of the coupling arrangement 18a. With collective reference to FIGS. 2a and 2b, the coupling arrangement 18a is here in a decoupled position 26. In the decoupled position 26, the drive part 20a and the driven part 22a are entirely separated.

In this example, the drive part 20a is a socket and the driven part 22a is a shaft. FIGS. 2a and 2b show a male driven profile 28 on the driven part 22a. The driven profile 28 is here exemplified as a hexagonal profile. That is, the driven profile 28 has a hexagonal cross-sectional shape transverse to the rotation axis 24. The driven profile 28 comprises six driven sides 30 and six intermediate driven edges 32.

The driven part 22a of this example further comprises a chamfered edge 34a. The chamfered edge 34a is positioned at an end of the driven part 22a (the right end in FIG. 2a).

The coupling arrangement 18a further comprises an aligning arrangement 36a. The aligning arrangement 36a is here provided on the drive part 20a, in an aligning section 38a thereof. The aligning arrangement 36a comprises a spring 40a and a plurality of balls 42a, here two balls 42a oppositely arranged with respect to the rotation axis 24. The spring 40a is here a leaf spring encircling a cylindrical body 44 of the drive part 20a. The balls 42a are received in openings in the cylindrical body 44. The spring 40a pushes the balls 42a radially inwards from the outside of the cylindrical body 44 to a protruding position where the balls 42a protrude into the interior of the cylindrical body 44. The balls 42a are examples of protruding elements according to the present disclosure.

Figure 3:
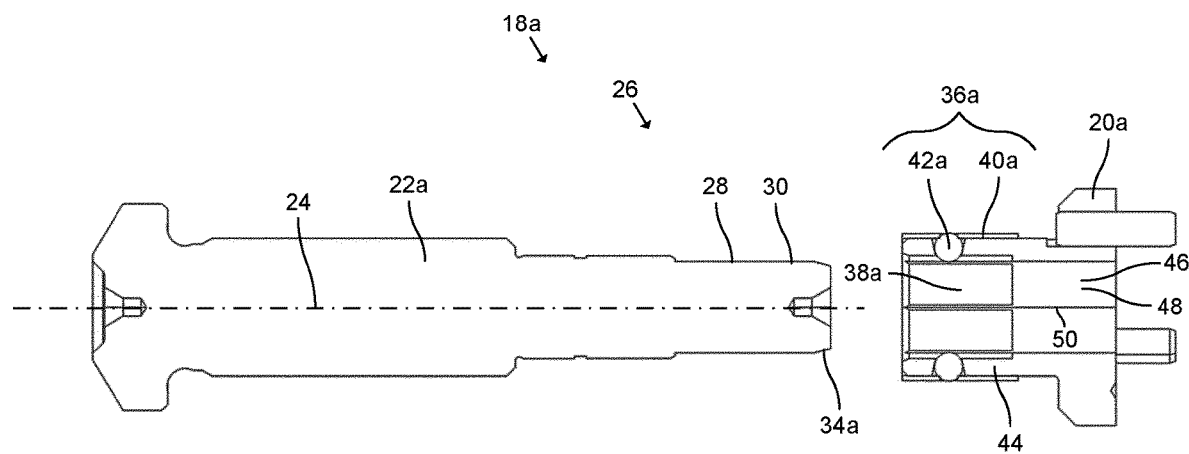
FIG. 3: schematically represents a cross-sectional side view of the coupling arrangement in the decoupled position.

FIG. 3 schematically represents a cross-sectional side view of the coupling arrangement 18a in the decoupled position 26. In FIG. 3, it can be seen that the drive part 20a comprises a female drive profile 46. The drive profile 46 is complementary to the driven profile 28. Thus, also the drive profile 46 is hexagonal in this example. The drive profile 46 comprises six drive sides 48 and six intermediate drive edges 50.

FIG. 3 further shows that a length of the aligning section 38a along the rotation axis 24 is approximately equal to a length of the drive profile 46 along the rotation axis 24. The length of the aligning section 38a along the rotation axis 24 may for example be at least 30% and/or less than 150% of a length of the drive profile 46 along the rotation axis 24. FIG. 3 further shows that the balls 42a lie in a common plane transverse to the rotation axis 24.

Figure 4A:
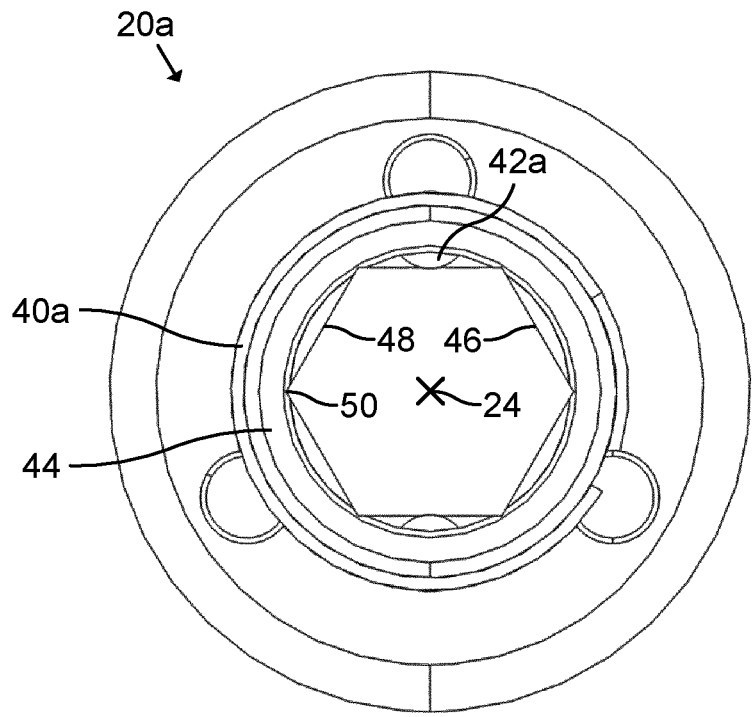
FIG. 4a: schematically represents a front view of a drive part of the coupling arrangement.
Figure 4B:
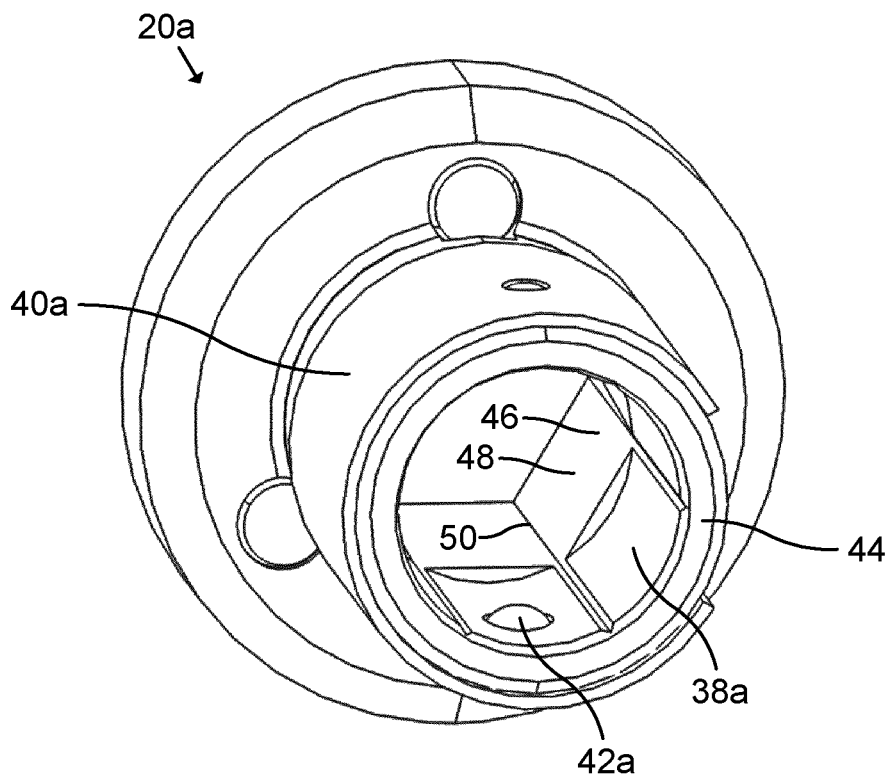
FIG. 4b: schematically represents a front perspective view of the drive part.

FIG. 4a schematically represents a front view of the drive part 20a, and FIG. 4b schematically represents a front perspective view of the drive part 20a. With collective reference to FIGS. 4a and 4b, it can be seen that the balls 42a are rotationally aligned, with respect to the rotation axis 24, with two opposite drive sides 48 of the drive profile 46. In the illustrated protruding position, each ball 42a is radially aligned, with the respect to the rotation axis 24, with the drive sides 48. The balls 42a may however protrude slightly radially inward of the drive sides 48.

Figure 5:
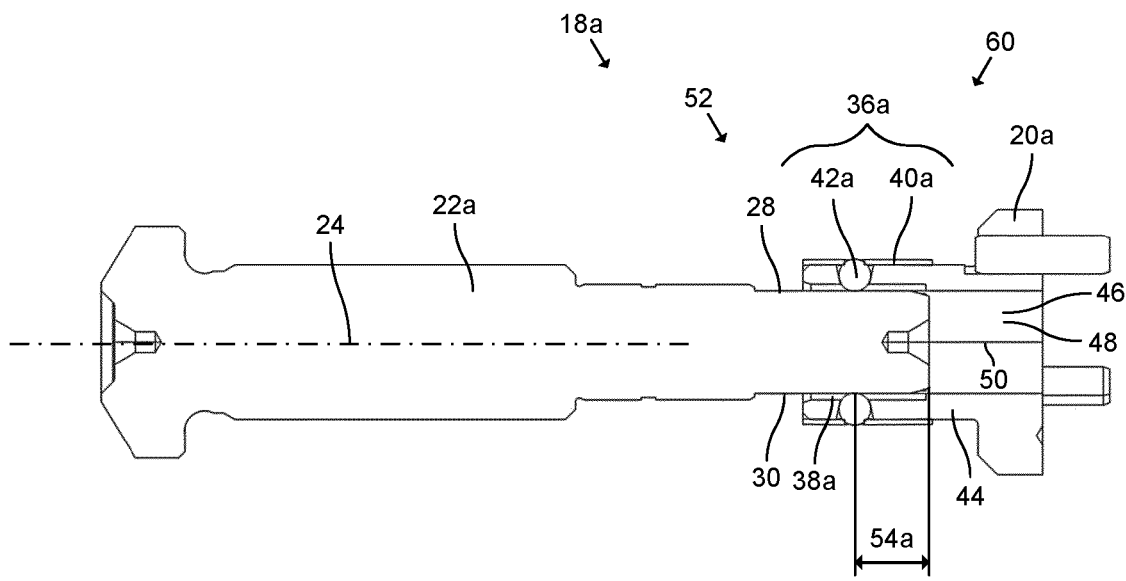
FIG. 5: schematically represents a cross-sectional side view of the coupling arrangement in an intermediate aligning position.

FIG. 5 schematically represents a cross-sectional side view of the coupling arrangement 18a in an intermediate aligning position 52. In the aligning position 52, the driven part 22a has been moved along the rotation axis 24 towards the drive part 20a such that the driven profile 28 enters into the aligning section 38a of the cylindrical body 44 of the drive part 20a. The driven profile 28 is now aligned with the aligning arrangement 36a along the rotation axis 24. The driven part 22a moves along the rotation axis 24 along an aligning distance 54a in the aligning position 52. Throughout the aligning distance 54a, the driven profile 28 is positioned between the balls 42a and the drive profile 46 along the rotation axis 24. During the time the driven part 22a moves through the aligning distance 54a, the driven profile 28 will become (if it not already is) rotationally aligned with the drive profile 46, as described herein. This enables a simple and seamless mating of the driven profile 28 and the drive profile 46.

Figure 6:
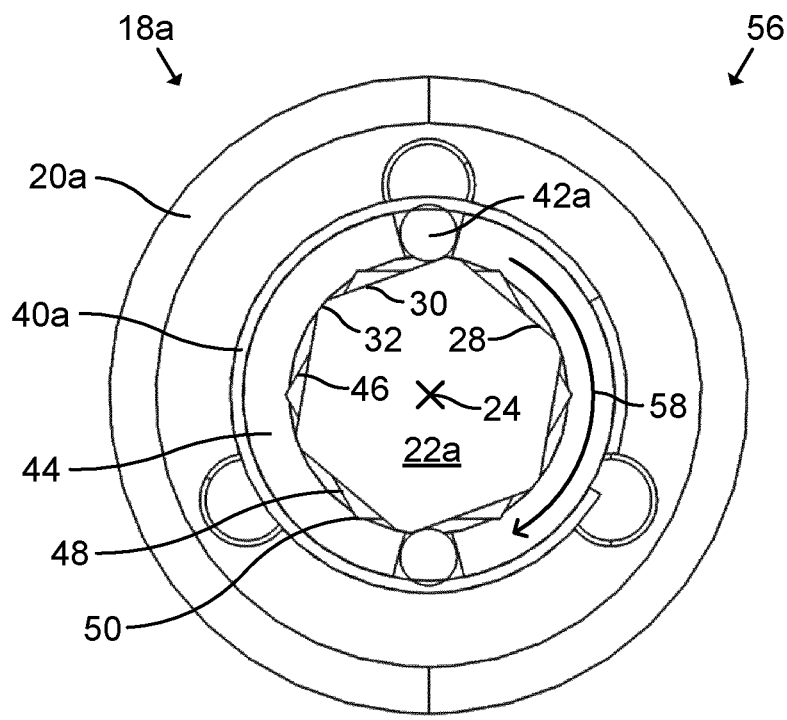
FIG. 6: schematically represents a cross-sectional front view of the coupling arrangement in a nonaligned state.

FIG. 6 schematically represents a cross-sectional front view of the coupling arrangement 18a in a nonaligned state 56. As shown in FIG. 6, the driven profile 28 is rotated 30 degrees about the rotation axis 24 relative to the drive profile 46. In this rotational position of the driven part 22a relative to the drive part 20a, the driven profile 28 cannot enter and mate with the drive profile 46.

As the driven profile 28 is inserted into the aligning section 38a, the chamfered edge 34a will push the balls 42a radially outwards if the driven profile 28 is not rotationally aligned with the drive profile 46. By pushing the balls 42a with the chamfered edge 34a instead of with a straight edge (transverse to the rotation axis 24), retraction of the balls 42a can be ensured in the nonaligned state 56. This contributes to a more reliable operation of the coupling arrangement 18a.

In the nonaligned state 56, the driven profile 28 only interferes with the balls 42a in the aligning section 38a. As shown in FIG. 6, the driven profile 28 pushes the balls 42a radially outwards against the deformation of the spring 40a. The balls 42a provide small contact surfaces with the driven profile 28. This contributes to a low friction of the relative movement between the drive part 20a and the driven part 22a, both axially and rotationally with respect to the rotation axis 24.

The spring 40a exerts a restoring and radially inwardly directed force on the balls 42a. This restoring force creates an aligning torque 58 on the driven profile 28 about the rotation axis 24 (clockwise in FIG. 6) and towards an aligned state.

Figure 7:
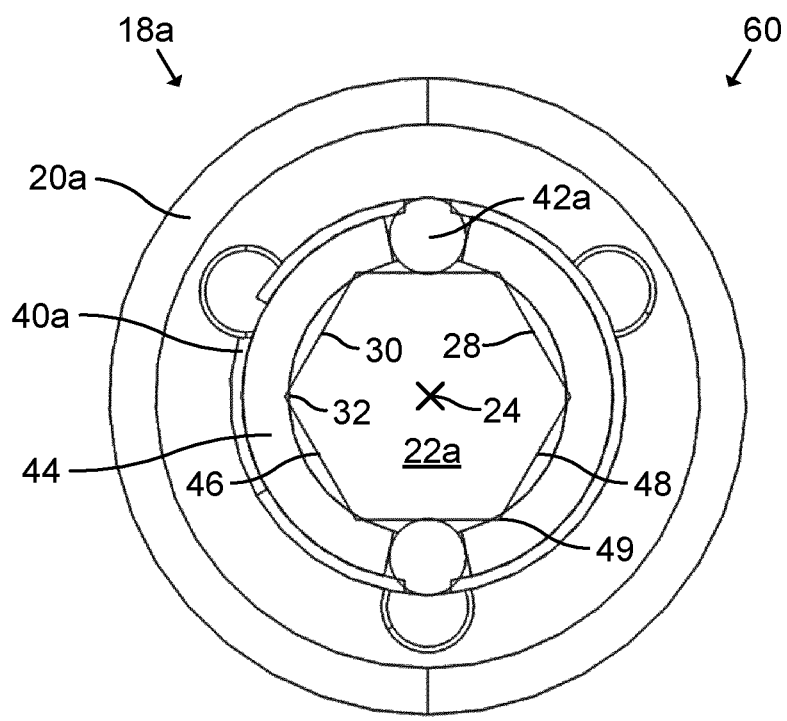
FIG. 7: schematically represents a cross-sectional front view of the coupling arrangement in an aligned state.

FIG. 7 schematically represents a cross-sectional front view of the coupling arrangement 18a in the aligned state 60. In the aligned state 60, the drive profile 46 and the driven profile 28 are rotationally aligned with respect to the rotation axis 24 for mating. Under the action of the spring 40a, the balls 42a strive towards the smallest cross-sectional dimension of the driven part 22a, here to the centers of the driven sides 30. The balls 42a protrude the most when the driven profile 28 is rotationally aligned with the drive profile 46. The aligning arrangement 36a thus forces a relative rotation between the drive part 20a and the driven part 22a about the rotation axis 24 from the nonaligned state 56 towards the aligned state 60.

Figure 8:
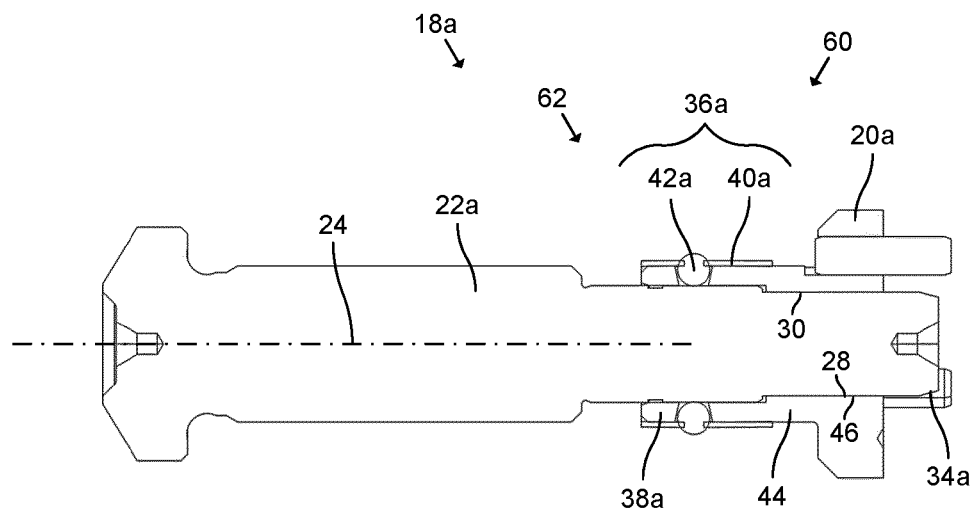
FIG. 8: schematically represents a cross-sectional side view of the coupling arrangement in a coupled position.

FIG. 8 schematically represents a cross-sectional side view of the coupling arrangement 18a in a coupled position 62. In the coupled position 62, the driven profile 28 has been mated with the drive profile 46. Torque can now be transferred between the drive part 20a and the driven part 22a.

Figure 9A:
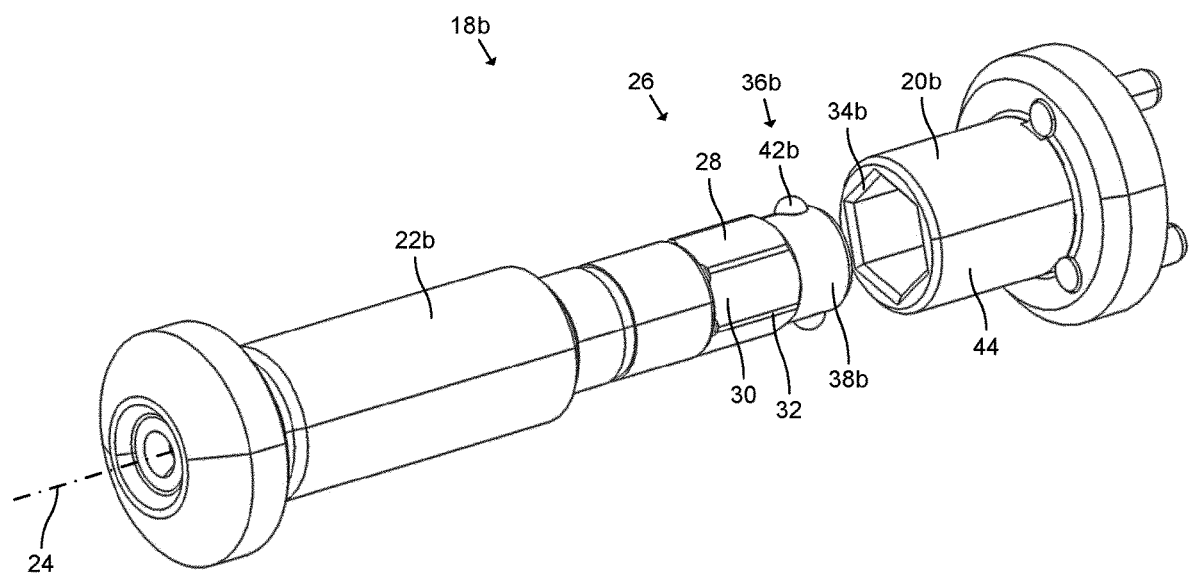
FIG. 9a: schematically represents a first perspective side view of a further example of a coupling arrangement in the decoupled position.
Figure 9B:
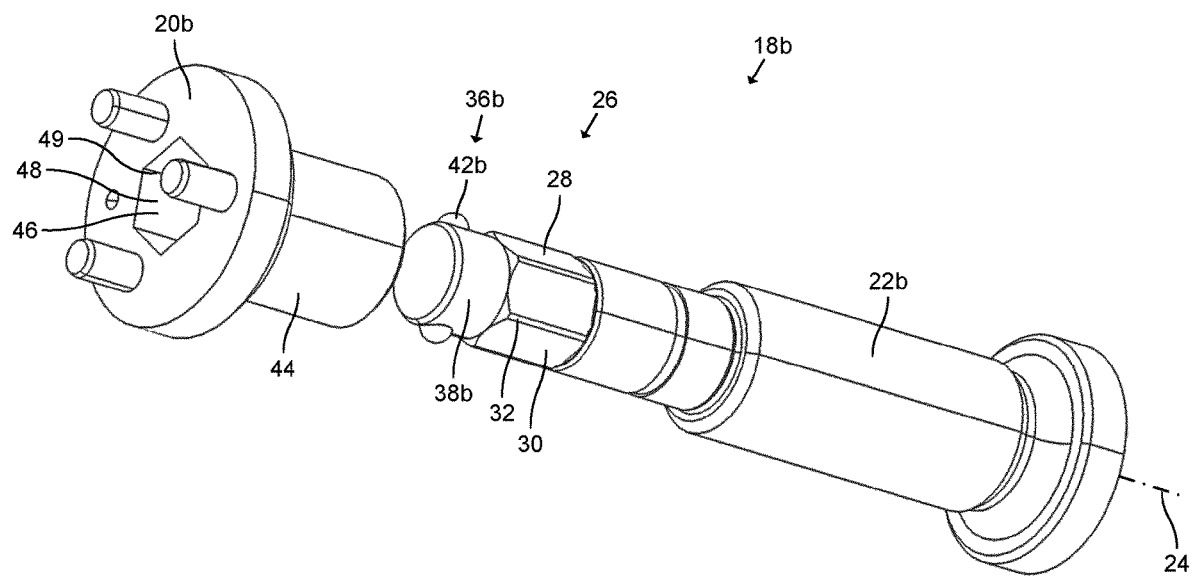
FIG. 9b: schematically represents a second perspective side view of the coupling arrangement in FIG. 9a in the decoupled position.

FIG. 9a schematically represents a first perspective side view of a further example of a coupling arrangement 18b, and FIG. 9b schematically represents a second perspective side view of the coupling arrangement 18b in FIG. 9a. The coupling arrangement 18b may replace the coupling arrangement 18a in the power tool 10 in FIG. 1. In the following, mainly differences of the coupling arrangement 18b with respect to the coupling arrangement 18a will be described.

With collective reference to FIGS. 9a and 9b, the coupling arrangement 18b is in the decoupled position 26. The coupling arrangement 18b comprises a drive part 20b, a driven part 22b and an aligning arrangement 36b. The aligning arrangement 36b is here provided on the driven part 22b. The driven part 22b comprises an aligning section 38b in front of the driven profile 28. The aligning arrangement 36b is provided in the aligning section 38b.

Also the aligning arrangement 36b of this example comprises two balls 42b. Each ball 42b is rotationally aligned with a unique driven edge 32. Both the balls 42b (in their neutral states) and the driven edges 32 also have a same radial extension.

Figure 10:
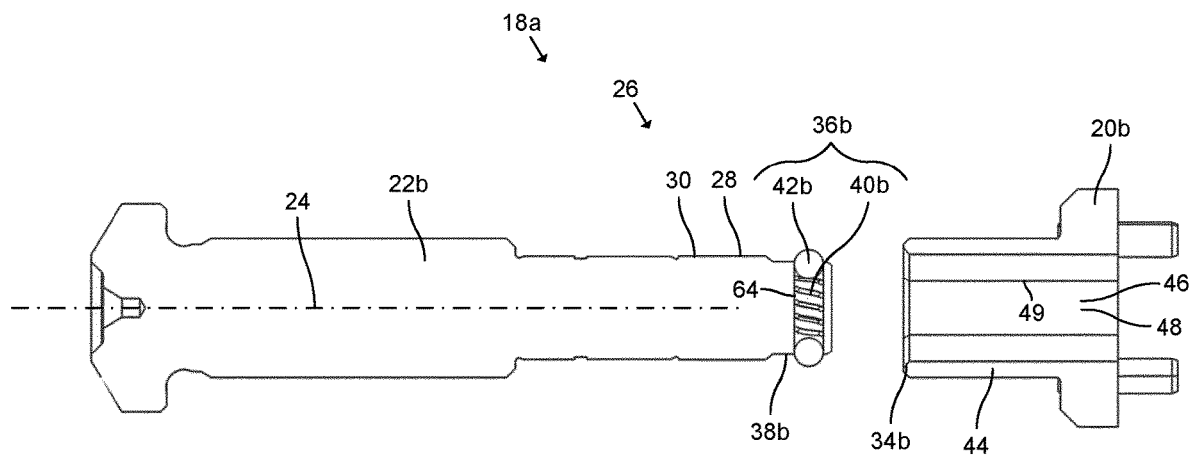
FIG. 10: schematically represents a cross-sectional side view of the coupling arrangement in FIGS. 9a and 9b in the decoupled position.

FIG. 10 schematically represents a cross-sectional side view of the coupling arrangement 18b in the decoupled position 26. In FIG. 10, it can be seen that the aligning arrangement 36b further comprises a spring 40b, here exemplified as a compression coil spring. The spring 40b is here arranged in a bore 64 in the aligning section 38b. The spring 40b pushes the balls 42b radially outwards.

The drive part 20b of this example comprises a chamfered edge 34b. The chamfered edge 34b is here arranged at an end of the cylindrical body 44 (the left end in FIG. 10).

Figure 11A:
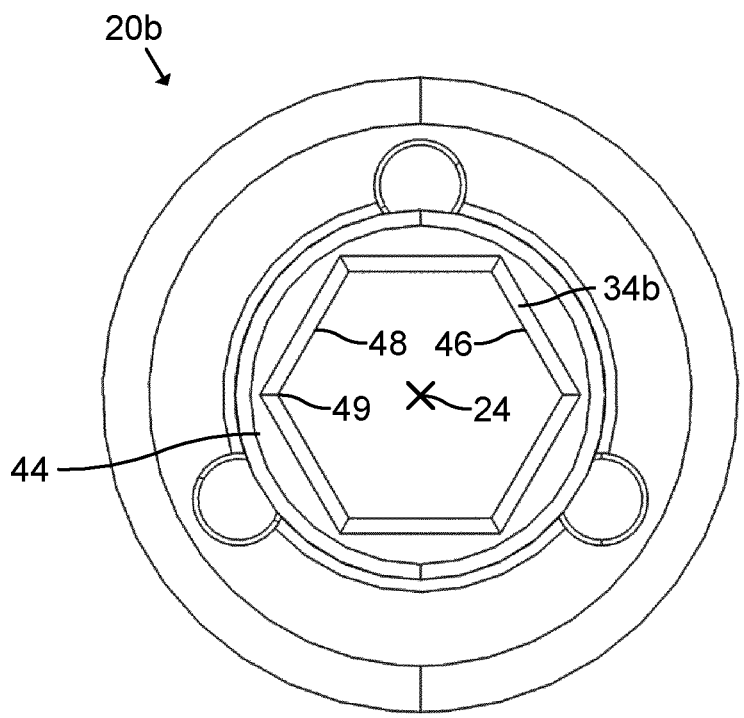
FIG. 11a: schematically represents a front view of a driven part of the coupling arrangement in FIGS. 9a and 9b.
Figure 11B:
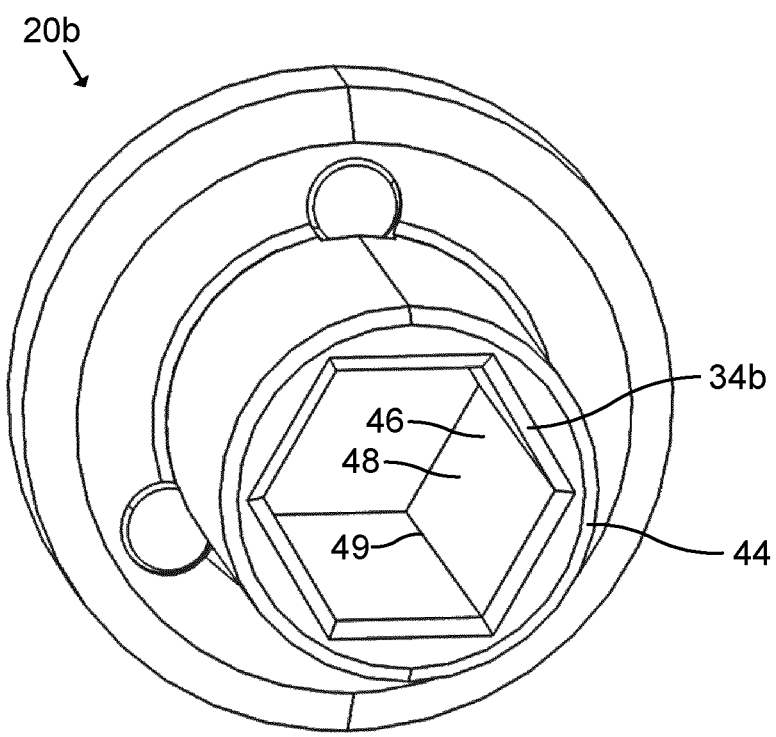
FIG. 11b: schematically represents a front perspective view of the driven part of the coupling arrangement in FIGS. 9a and 9b.

FIG. 11a schematically represents a front view of the driven part 22b, and FIG. 11b a front perspective view of the driven part 22b. With collective reference to FIGS. 11a and 11b, it can be seen that the drive profile 46 of this example extends through the entire drive part 20b. Thus, the drive part 20b of this example does not comprise any aligning section.

Figure 12:
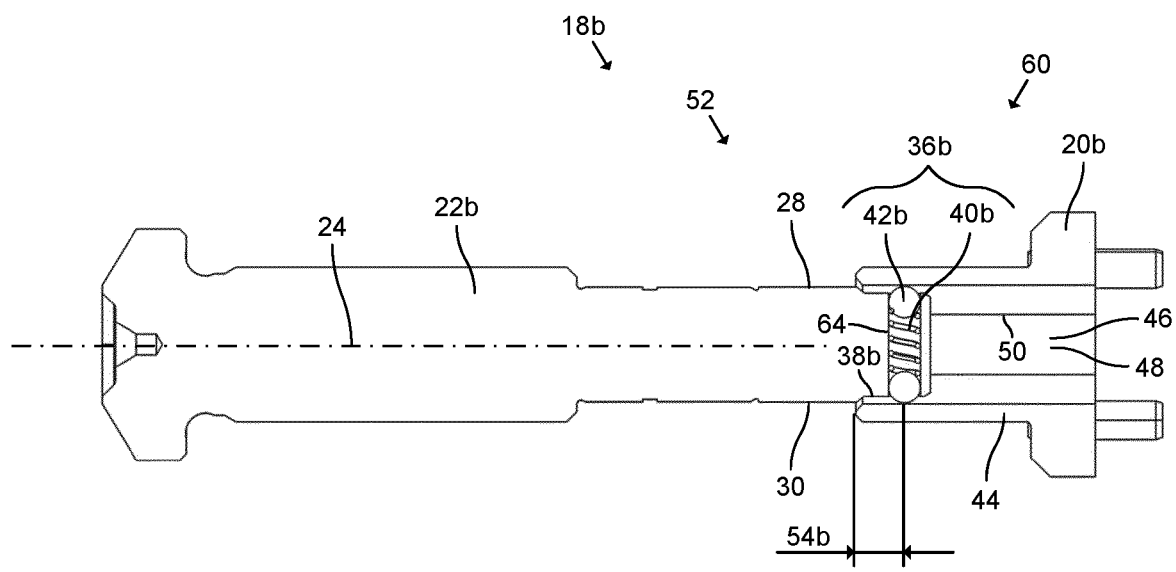
FIG. 12: schematically represents a cross-sectional side view of the coupling arrangement in FIGS. 9a and 9b in the intermediate aligning position.

FIG. 12 schematically represents a cross-sectional side view of the coupling arrangement 18b in the aligning position 52. The drive profile 46 is now aligned with the aligning arrangement 36b along the rotation axis 24.

When the aligning section 38b enters the drive profile 46, the chamfered edge 34b will push the balls 42b radially inwards against the deformation of the spring 40b if the drive part 20b is not rotationally aligned with the driven part 22b. The driven part 22b moves along the rotation axis 24 along an aligning distance 54b in the aligning position 52. Throughout the aligning distance 54b, the drive profile 46 is positioned over the balls 42b but not over the driven profile 28. During the time the driven part 22b moves through the aligning distance 54b, the driven profile 28 will become (if it not already is) rotationally aligned with the drive profile 46.

In the aligning position 52, the balls 42b are pushed radially inwards by the drive sides 48 if the driven profile 28 is not aligned with the drive profile 46. In this way, the aligning arrangement 36b forces a relative rotation between the drive part 20b and the driven part 22b about the rotation axis 24 from the nonaligned state 56 towards the aligned state 60.

Figure 13:
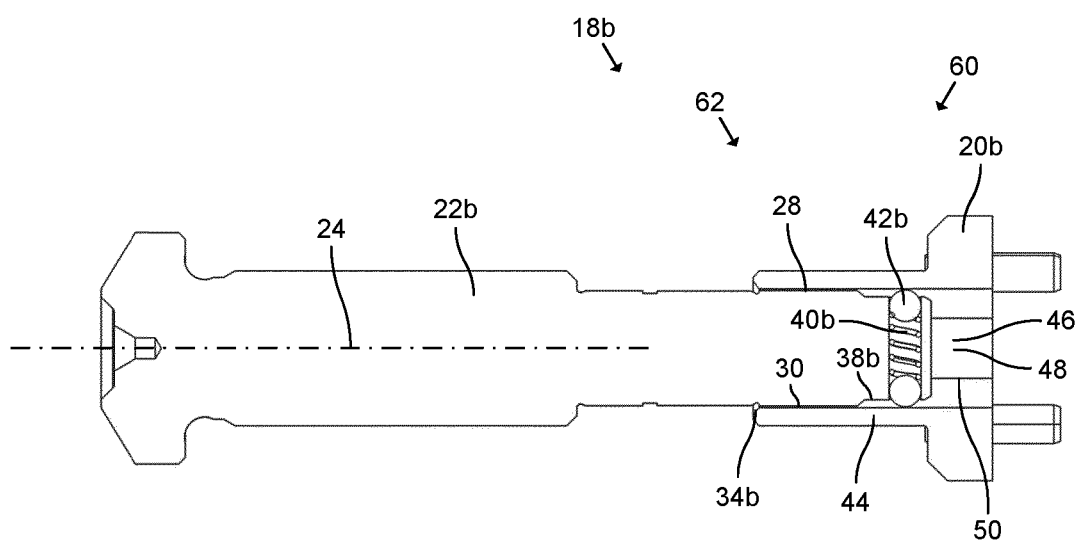
FIG. 13: schematically represents a cross-sectional side view of the coupling arrangement in FIGS. 9a and 9b in the coupled position.

FIG. 13 schematically represents a cross-sectional side view of the coupling arrangement 18b in the coupled position 62. The drive part 20b is now rotationally aligned with the driven part 22b and the drive profile 46 mates with the driven profile 28 for torque transfer between the drive part 20b and the driven part 22b.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A coupling arrangement for a tool, the coupling arrangement comprising:
a drive part rotatable about a rotation axis, the drive part comprising a drive profile;
a driven part rotatable about the rotation axis, the driven part comprising a driven profile complementary to the drive profile, the driven profile being arranged to mate with the drive profile in a coupled position for torque transfer between the drive part and the driven part; and
an aligning arrangement arranged to force a relative rotation between the drive part and the driven part about the rotation axis during relative movement of the drive part and the driven part along the rotation axis, from a nonaligned state of the coupling arrangement, where the drive profile is not rotationally aligned with the driven profile, towards an aligned state of the coupling arrangement, where the drive profile is rotationally aligned with the driven profile, wherein the aligning arrangement comprises one or more protruding elements, each arranged to exert a torque on the drive profile or on the driven profile in the nonaligned state, wherein the aligning arrangement comprises a spring, wherein the one or more protruding elements are arranged to be moved against the deformation of the spring, and wherein the spring is arranged to force the one or more protruding elements in a radial direction with respect to the rotation axis.

2. The coupling arrangement according to claim 1, wherein the aligning arrangement is provided on the drive part or on the driven part.

3. The coupling arrangement according to claim 1, wherein the driven part is movable relative to the drive part along the rotation axis from a decoupled position where the driven part is separated from the drive part, to an intermediate aligning position where the drive profile or the driven profile is aligned with the aligning arrangement along the rotation axis, and to the coupled position where driven profile mates with the drive profile.

4. The coupling arrangement according to claim 3, wherein the aligning arrangement is arranged to force the relative rotation between the drive part and the driven part in the aligning position.

5. The coupling arrangement according to claim 1, wherein at least one of the one or more protruding elements comprises a round shape for contacting the drive profile or the driven profile.

6. The coupling arrangement according to claim 1, wherein the one or more protruding elements is a plurality of protruding elements.

7. The coupling arrangement according to claim 6, wherein the plurality of protruding elements lie in a common plane transverse to the rotation axis.

8. The coupling arrangement according to claim 6, wherein the plurality of protruding elements are substantially evenly distributed around the rotation axis.

9. The coupling arrangement according to claim 8, wherein the drive profile and the driven profile each has a polygonal shape, wherein the one or more protruding elements comprises at least two adjacent protruding elements, and wherein an angular distance with respect to the rotation axis between the at least two adjacent protruding elements corresponds to an angular distance with respect to the rotation axis between two edges of the polygonal shapes.

10. The coupling arrangement according to claim 9, wherein the aligning arrangement is provided on the drive part, and wherein each protruding element of the one or more protruding elements is rotationally aligned, with respect to the rotation axis, with a unique side of the polygonal shape of the drive profile.

11. The coupling arrangement according to claim 9, wherein the aligning arrangement is provided on the driven part, and wherein each protruding element of the one or more protruding elements is rotationally aligned, with respect to the rotation axis, with a unique edge of the polygonal shape of the driven profile.

12. A coupling arrangement for a tool, the coupling arrangement comprising:
a drive part rotatable about a rotation axis, the drive part comprising a drive profile;
a driven part rotatable about the rotation axis, the driven part comprising a driven profile complementary to the drive profile, the driven profile being arranged to mate with the drive profile in a coupled position for torque transfer between the drive part and the driven part, wherein the drive profile and the driven profile each has a polygonal shape; and
an aligning arrangement arranged to force a relative rotation between the drive part and the driven part about the rotation axis during relative movement of the drive part and the driven part along the rotation axis, from a nonaligned state of the coupling arrangement, where the drive profile is not rotationally aligned with the driven profile, towards an aligned state of the coupling arrangement, where the drive profile is rotationally aligned with the driven profile, wherein the aligning arrangement comprises one or more protruding elements, each arranged to exert a torque on the drive profile or on the driven profile in the nonaligned state, wherein the aligning arrangement comprises a spring, wherein the one or more protruding elements are arranged to be moved against the deformation of the spring, and wherein the spring is arranged to force the one or more protruding elements in a radial direction with respect to the rotation axis.

13. The coupling arrangement according to claim 12, wherein the driven part is movable relative to the drive part along the rotation axis from a decoupled position where the driven part is separated from the drive part, to an intermediate aligning position where the drive profile or the driven profile is aligned with the aligning arrangement along the rotation axis, and to the coupled position where driven profile mates with the drive profile.

14. The coupling arrangement according to claim 13, wherein the aligning arrangement is arranged to force the relative rotation between the drive part and the driven part in the aligning position.

15. The coupling arrangement according to claim 13, wherein the aligning arrangement is provided on the drive part, and wherein each protruding element of the one or more protruding elements is rotationally aligned, with respect to the rotation axis, with a unique side of the polygonal shape of the drive profile.

16. The coupling arrangement according to claim 12, wherein the one or more protruding elements comprises at least two adjacent protruding elements, and wherein an angular distance with respect to the rotation axis between the at least two adjacent protruding elements corresponds to an angular distance with respect to the rotation axis between two edges of the polygonal shapes.

17. A tool comprising a coupling arrangement for a tool, the coupling arrangement comprising:
a drive part rotatable about a rotation axis, the drive part comprising a drive profile;
a driven part rotatable about the rotation axis, the driven part comprising a driven profile complementary to the drive profile, the driven profile being arranged to mate with the drive profile in a coupled position for torque transfer between the drive part and the driven part; and
an aligning arrangement arranged to force a relative rotation between the drive part and the driven part about the rotation axis during relative movement of the drive part and the driven part along the rotation axis, from a nonaligned state of the coupling arrangement, where the drive profile is not rotationally aligned with the driven profile, towards an aligned state of the coupling arrangement, where the drive profile is rotationally aligned with the driven profile, wherein the aligning arrangement comprises one or more protruding elements, each arranged to exert a torque on the drive profile or on the driven profile in the nonaligned state, wherein the aligning arrangement comprises a spring, wherein the one or more protruding elements are arranged to be moved against the deformation of the spring, and wherein the spring is arranged to force the one or more protruding elements in a radial direction with respect to the rotation axis.

* * * * *

UNITED STATES PATENT AND TRADEMARK OFFICE
CERTIFICATE OF CORRECTION

| | |
|---|---|
| PATENT NO. | : 12,290,863 B2 |
| APPLICATION NO. | : 18/567079 |
| DATED | : May 6, 2025 |
| INVENTOR(S) | : Patrik Andersson et al. |

Page 1 of 1

It is certified that error appears in the above-identified patent and that said Letters Patent is hereby corrected as shown below:

In the Claims

In Column 10, Claim 17, Line 24, "for a tool" should be removed.

Signed and Sealed this
Twenty-first Day of October, 2025

John A. Squires
*Director of the United States Patent and Trademark Office*